May 14, 1968

J. O. MELTON ET AL 3,382,583

MEASURING DEVICE

Filed Nov. 29, 1965

INVENTORS
JAMES O. MELTON,
THOMAS B. WILKINSON &
BY KIMBALL A. ROBERTSON

ATTORNEYS

United States Patent Office 3,382,583
Patented May 14, 1968

3,382,583
MEASURING DEVICE
James O. Melton, Norman, and Thomas B. Wilkinson and Kimball A. Robertson, Oklahoma City, Okla., assignors to Jamco, Inc., Oklahoma City, Okla., a corporation of Oklahoma
Filed Nov. 29, 1965, Ser. No. 510,294
9 Claims. (Cl. 33—181)

ABSTRACT OF THE DISCLOSURE

A measuring gauge for determining the position of the frame of an automobile relative to various portions of the running gear and including an elongated shaft having a pair of axially aligned, telescoped sections and further having rim engaging tines disposed at opposite ends of the shaft. A support plate is slidably mounted on the shaft for axial movement therealong, and carries an extension arm which can be moved transversely relative to the elongated shaft, and can also be pivoted about a vertical axis when the elongated shaft is extended between the rims of the wheels of an automobile. A flexible measuring device is secured to one end of the extension arm.

---

This invention relates to a measuring gauge for determining the position of the frame of an automobile relative to the wheels thereof, or to other portions of the running gear of the automobile.

After an automobile has been in operation for a limited time, certain elements of the front end steering assembly of the car tend to become misaligned with the result that excessive tire wear may occur, shimmying and difficulty in steering can occur, and wear on bearings and moving parts in the steering assembly is accelerated. Operation of the vehicle becomes more difficult and more dangerous. It is thus fairly standard practice to align the front end of automobiles which have been in use for some time. This procedure requires readjustment of several linkages, replacement of several parts and, in the course of such maintenance, requires the taking and utilization of a number of angular and linear measurements.

An initial measurement which is conventionally made before continuing and completing the alignment of the front end, is a measurement to ascertain the vertical position of the frame of the automobile relative to various parts in the front end steering assembly. Various types of gauges and instruments have been devised to accomplish this measurement. Some measure the height of the frame with reference to the ground. Where one or both of the front tires of the automobile are low, or where the ground is not perfectly level, the measurements obtained with a gauge of this type are inaccurate or misleading. Other gauges measure the vertical distance of the frame above some other part of the vehicle, and work well enough on some types of automobiles. Due to the differences in the construction of the front end assemblies of different automobiles, however, a gauge of this type frequently cannot be used effectively on some types of automobiles due to interference by certain mechanical elements of the front end assembly which protrude into an interfering position, or due to the inaccessibility to the gauge of the part from which the measurement should be made.

The present invention provides an improved gauge for measuring the vertical height of an automobile frame in relation to one or more reference elements forming a part of, or located adjacent, the front end steering assembly of the automobile. The gauge may be said to be universal in character, since it can be easily adjusted to measure from a reference plane in a vertical direction to the frame, or to any number of other elements in or adjacent the front end steering assembly of the automobile.

Broadly described, the measuring gauge of the invention comprises an elongated shaft having first and second sections axially aligned and adjustably engaged to facilitate varying the length of the shaft. The shaft is provided with rim engaging means disposed at opposite ends thereof for engaging the rims of the front wheels of the automobile so that the shaft occupies a substantially horizontal plane. Slidably mounted on the shaft for axial movement therealong is a support plate upon which is mounted an extension arm. The manner in which the extension arm is mounted on the support plate is an important aspect of the invention since it makes accessible to measurement, the distances between the substantially horizontal plane occupied by the shaft and a number of different parts of the frame or front end assembly of the automobile which would otherwise be difficult to reach with conventional gauges.

To achieve the flexibility in direction and position of measurement which is thus characteristic of the measuring gauge of the invention, the extension arm is mounted on the support plate for linear sliding movement in a direction which is axial with respect to the extension arm and transverse with respect to the elongated shaft. It is further preferred, though not essential, that the extension arm be mounted on the support plate for pivoting about a vertical axis so that the angle at which it extends with respect to the elongated shaft can be varied.

As a final element of the measuring gauge, a flexible tape or similar measuring means is attached to one end of the extension arm and is provided with suitable indicia to permit linear distances from the plane of the extension arm to various parts of the front end assembly to be measured. In a preferred embodiment of the invention, the tape is stored within a housing on a spring biased reel, and the housing is welded or otherwise suitably secured to the end of the extension arm.

From the foregoing description of the invention, it will be perceived that it is a major object of the invention to provide an improved measuring gauge for use in ascertaining the relative position of the frame of the automobile to parts of the front end steering assembly thereof prior to undertaking the alignment of the front end of the automobile.

A further object of the present invention is to provide a measuring gauge which can be used to measure distances between an established horizontal reference plane and any of various pre-selected parts of the front end assembly of an automobile in order to establish the extent to which the frame of the automobile has shifted or moved from its original position occupied at the time of manufacture of the automobile.

Another object of the present invention is to provide a relatively inexpensive measuring gauge for use in the alignment of the front end of automobiles, which measuring gauge is rugged in construction and characterized in having a long and trouble-free operating life.

In addition to the foregoing described objects and advantages, additional objects and advantages will become apparent as the following detailed description is read in conjunction with the accompanying drawings which illustrate the invention.

Figure 1:
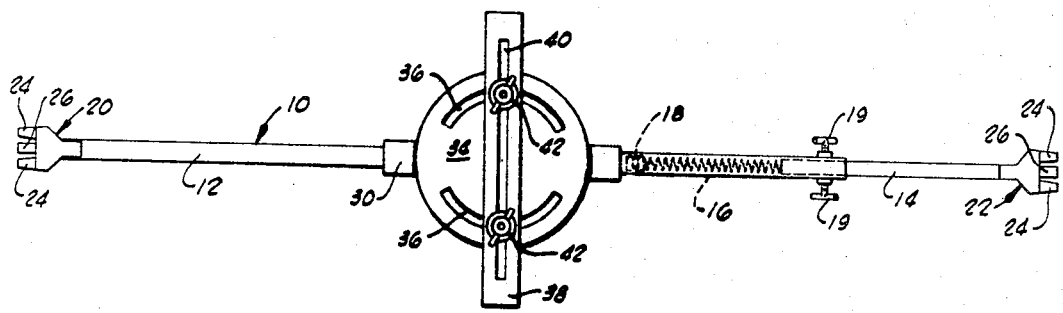
FIGURE 1 is a plan view of the measuring gauge of the invention.

Referring now to the drawings in detail, and particularly to FIGURE 1, the measuring gauge includes an elongated shaft designated generally by reference numeral 10, which shaft includes a first section 12 which telescopingly receives a second section 14. In the illustrated embodiment, the portions 12 and 14 of the elongated shaft 10 are both of rectangular cross section, but it will be readily apparent that the two sections of the shaft could be made cylindrical or of triangular or other cross section, if such construction should be preferred. The use of the two telescoping sections of the shaft 10 permits the overall length of the elongated shaft to be varied so that the measuring gauge can be used in obtaining measurements on automobiles having differing wheel bases. The significance of this adjustability will be better understood as the description of the invention proceeds. In the preferred embodiment of the invention illustrated in the drawings, the section 14 of the shaft 10 is biased outwardly by a resilient member, such as a coil spring 16, disposed within the shaft portion 12 and bearing against a suitable stop 18 extending through the section 12. A pair of arresting screws 19 are extended through opposite sides of the shaft section 12 and bear against the shaft section 14 to lock this shaft section in a desired position.

Figure 2:
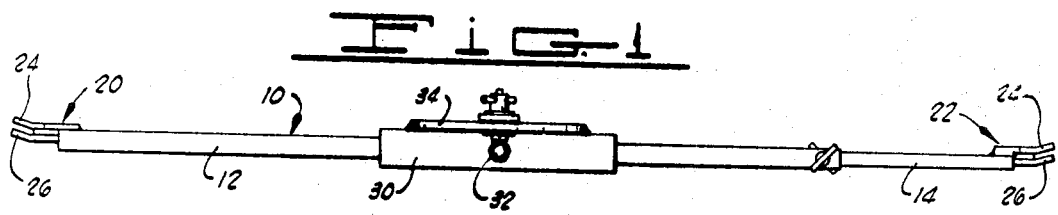
FIGURE 2 is a side elevation view of the measuring gauge.
Figure 4:
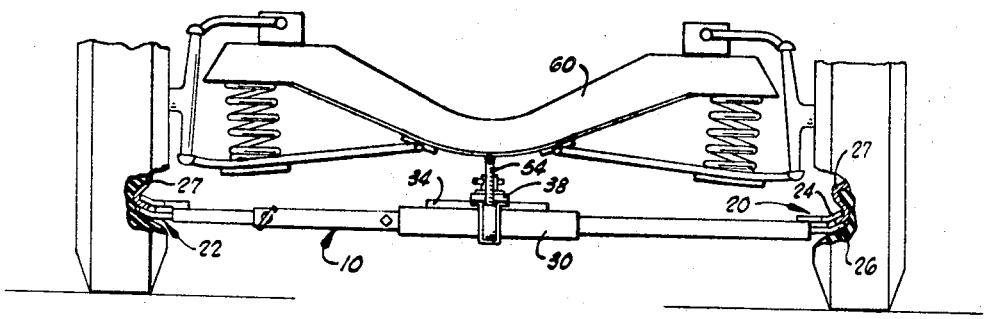
FIGURE 4 is a view in elevation with parts broken away to show the manner in which the measuring gauge of the invention is mounted on an automobile when taking measurements.

At opposite ends of the elongated shaft 10 and mounted on the shaft sections 12 and 14, respectively, are a pair of rim engaging means designated generally by reference characters 20 and 22. Each of the rim engaging means 20 and 22 includes three outwardly extending tines. The two outer tines are, in each case, designated by reference character 24 and will be perceived in referring to FIGURE 2 to extend upwardly at an angle with respect to the plane of the elongated shaft 10. The central tine 26 of each of the rim engaging means 20 and 22 also extends upwardly at an angle with respect to the plane of the shaft 10, but is spaced vertically downwardly slightly from the plane occupied by the two outer tines 24. There is thus defined a gap or space between the central tine 26 and the outer tines 24 in each of the rim engaging means 20 and 22. This construction facilitates the engagement of the rim engaging means with the beaded edge or peripheral boundary of the tire rims of the automobile so that the measuring gauge may be extended between these tire rims and supported thereon with the elongated shaft 10 occupying a substantially horizontal plane. Positioning of the gauge in this manner by engagement with tire rims 27 is best illustrated in FIGURE 4 of the drawings.

Positioned between the ends of the elongated shaft 10 and slidably mounted thereon is a sleeve 30. In the illustrated embodiment, the sleeve 30 is of rectangular cross section. The sleeve 30 carries a pair of arresting screws 32 disposed on opposite sides of the shaft 10 so that the position of the sleeve 30 on the shaft 10 can be fixed by setting up on one or both of the arresting screws 32. Provision of arresting screws on opposite sides of the shaft 10 facilitates access to at least one of these screws regardless of the position of the shaft 10, or the construction of the front end assembly of the automobile. A support plate 34 is welded or otherwise suitably secured to the upper surface of the sleeve 30 for movement with the sleeve along the shaft 10. The support plate 34 used in the illustrated embodiment is a circular, disk-shaped member which is provided with a pair of arcuate slots 36, each of which is formed on the circumference of a circle.

Figure 3:
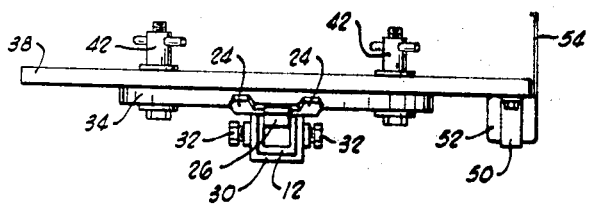
FIGURE 3 is an end view of the measuring gauge.

Slidably mounted on the support plate 34 is an elongated extension arm 38. The extension arm 38 is provided with an axially extending slot 40 which extends across and intersects the arcuate slots 36 formed in the support plate 34. Suitable clamping screw and nut combinations 42 are extended through the slots 36 and 40 as best shown in FIGURES 1 and 3. By means of this arrangement, the extension arm 38 can be shifted transversely with respect to the elongated shaft 10, or may be pivoted about a vertical axis which extends through the center of the support plate 34 so that the angle formed by the extension arm with the elongated shaft 10 can be varied as desired. Once the extension arm 38 has been moved to a desired position relative to the elongated shaft 10, it can be locked in this position using one or both of the clamping screw and nut combinations 42.

At one end of the extension arm 38, a downwardly extending bracket 50 is provided and is used to retain a flexible metal tape cartridge 52 on the end of the extension arm. The flexible tape cartridge 52 houses a spring biased tape drum (not shown) of conventional structure which carries a flexible steel tape 54, one end of which is illustrated in FIGURE 3. As is well understood in the art of tape type measuring devices of this kind, the flexible steel tape 54 can be withdrawn from the housing 52 against the bias of a spring loaded drum and used for measuring distances. Upon completion of the use of the tape, it can be released so that the tape is automatically rewound on the spring biased drum and stored within the housing 52.

OPERATION

In the operation of the measuring gauge of the invention, the gauge is utilized for initially determining the manner in which the frame of the automobile may have changed in its relative position with respect to other parts of the front end assembly of the running gear. Thus, if as a result of weakened springs, for example, the frame has been permitted to sag with respect to the control arms and other elements of the front end assembly, this fact should be known before other steps in front end alignment are taken.

To the end of ascertaining the relative position of the frame with respect to other elements of the front end assembly, the measuring gauge of the present invention is first placed in position by engaging the edges of the rims 27 of each of the front wheels with the rim engaging means 20 and 22 disposed at each end of the elongated shaft 10. The manner in which this engagement is effected is illustrated in FIGURE 4. Referring to this figure of the drawings, it will be noted that the center tine 26 of each of the rim engaging means 20 and 22 is passed under the edge of the rim, and the two outer tines 24 of each rim engaging means are passed over the edge of the rim. The meauring gauge is thus retained in position so that the elongated shaft 10 extends in a substantially horizontal plane between the two rims. Although in the case, for example, where one of the tires may be lower or contain less air than the other, the elongated shaft 10 may not extend precisely horizontally, it nevertheless forms a reference plane from which measurements can be made, which plane represents the fixed position of elements of the front end assembly with reference to the frame of the vehicle. With the elongated shaft 10 positioned in the manner described and as illustrated in FIGURE 4, the sleeve 30 can then be moved on the shaft to a position which will facilitate measuring from the general plane of the shaft 10 to a particular element on the vehicle. As illustrated in FIGURE 4, measurement is being effected between the reference plane and a forward cross member of the frame 60 of the vehicle. In the case of some types of automobiles, this particular measurement may be inconvenient or impossible because of the intervention of other mechanical elements of the vehicle. In this eventuality, the sleeve 30 can be moved to a different position along the elongated shaft 10 and, if desired, the extension arm 38 can be swiveled on the supporting plate 34 so that it extends at an angle with respect to the shaft 10. The extension arm 38 can also be moved transversely with respect to the shaft 10 on the supporting plate 34 so as to reach further forwardly or rearwardly with respect to the longitudinal axis of the vehicle. This movement of the extension arm 38 will bring the flexible tape housing 52 into vertical alignment with a part to which it is desired to measure so that the tape 54 can be extended in a vertical direction to make the necessary measurement.

From the foregoing description of the invention, it will be apparent that the described measuring gauge can be effectively utilized to ascertain the vertical position of the frame of the automobile relative to substantially any part of the front end assembly on any type of automobile. The adjustability of the length of the elongated shaft 10 permits the gauge to be used on cars having differing wheel bases, and the adjustability of the position of the flexible tape or other measuring means in its relation to the elongated shaft 10 assures that the measurement between the plane of the elongated shaft and any number of other elements in the front end assembly can be effected in an accurate manner.

Although a specific embodiment of the invention has been herein described as an example of its construction, it will be understood that various modifications and changes can be made in this construction without departing from the basic principles of the invention. Changes and modifications of this type are therefore deemed to be circumscribed by the spirit and scope of the invention except as the same may be necessarily limited by the appended claims or reasonable equivalents thereof.

We claim:

1. A measuring gauge for use in automobile front end alignment comprising:
   an elongated shaft including first and second sections movably secured to each other in axial alignment whereby the length of said shaft can be varied;
   rim engaging means on the opposite ends of said shaft for securing the shaft between the rims of the front wheels of an automobile;
   supporting means movably mounted on said shaft for movement in an axial direction therealong;
   an elongated extension arm movably mounted on said supporting means for axial movement in a transverse direction across said elongated shaft, and for pivotal movement about an axis extending coincident with or parallel to a line extending normal to said elongated shaft, said extension arm extending transversely across said elongated shaft;
   measuring means mounted on one end of said extension arm; and
   means for fixing said extension arm at a preselected position on said supporting means and at a preselected angle with respect to the elongated shaft.

2. A measuring gauge as defined in claim 1 wherein said supporting means comprises:
   a sleeve at least partially encircling said shaft and slidable axially therealong; and
   a supporting plate secured to said sleeve and having a surface extending in a plane substantially parallel to the axis of said elongated shaft.

3. A measuring gauge as claimed in claim 1 wherein said first and second sections are slidably telescoped, one within the other.

4. A measuring gauge as claimed in claim 3 and further characterized to include
   resilient biasing means in the one of said sections which is telescoped over the other of said sections and resiliently bearing against said other section to urge said other section outwardly with respect to said one section; and
   releasable stop means engageable with both of said sections for fixing the relative position of the two sections.

5. A measuring gauge for use in automobile front end alignment comprising:
   an elongated shatf including first and second sections movably secured to each other in axial alignment whereby the length of said shaft can be varied;
   a plurality of tines rigidly secured to each of the ends of said elongated shaft and projecting from the shaft in an axial direction, the tines disposed on each end of said shaft being spaced from each other to define a gap adapted to engage the edge of a tie rim;
   supporting means movably mounted on said shaft for movement in an axial direction therealong;
   an extension arm movably mounted on said supporting means and extending transversely across said elongated shaft; and
   measuring means mounted on one end of said extension arm.

6. A measuring gauge for use in automobile front end alignment comprising:
   an elongated shaft including first and second sections movably secured to each other in axial alignment whereby the length of such shaft can be varied;
   rim engaging means on the opposite ends of said shaft for securing the shaft between the rims of the front wheels of an automobile;
   a sleeve at least partially encircling said shaft and slidable axially therealong;
   a supporting plate secured to said sleeve and having a surface extending in a plane substantially parallel to the axis of said elongated shaft;
   an extension arm movably mounted on said supporting plate and extending transversely across said elongated shaft;
   measuring means mounted on one end of said extension arm; and
   releasable securing means for fixing the position of said extension arm relative to said supporting plate after said measuring means has been located in a desired position by moving said extension arm.

7. A measuring gauge as claimed in claim 6 wherein said supporting plate is provided with at least one arcuate aperture therethrough and said extension arm is provided with an elongated slot extending axially in the extension arm and across the arcuate aperture in said supporting plate, and wherein securing means comprises a clamping screw and nut combination extending through the elongated slot and arcuate aperture.

8. A measuring gauge for use in automobile front end alignment comprising:
   an elongated shaft including first and second sections movably secured to each other in axial alignment whereby the length of said shaft can be varied;
   rim engaging means on the opposite ends of said shaft for securing the shaft between the rims of the front wheels of an automobile;
   a supporting plate slidably mounted on said shaft for sliding movement in an axial direction therealong;
   an extension arm slidably and pivotally mounted on said support plate for linear movement in a direction at a variable pre-selected angle to said elongated shaft; and
   flexible measuring means connected to one end of said extension arm and spaced from said elongated shaft.

9. A measuring gauge for use in automobile front end alignment comprising:
   an elongated shaft including first and second sections movably secured to each other in axial alignment whereby the length of said shaft can be varied;
   rim engaging means on the opposite ends of said shaft for securing the shaft between the rims of the front wheels of an automobile;

supporting means movably mounted on said shaft for movement in an axial direction therealong;

an extension arm movably mounted on said supporting means for extending transversely across said elongated shaft;

a measuring tape housing secured to said extension arm at one end thereof; and a flexible measuring tape stored in said tape housing and withdrawable therefrom.

References Cited

UNITED STATES PATENTS

| | | | |
|---|---|---|---|
| 2,000,866 | 5/1935 | Smith | 33—203.20 X |
| 2,160,723 | 5/1939 | Eldridge | 33—169 X |
| 2,599,835 | 6/1952 | Johnson et al. | 33—169 X |

FOREIGN PATENTS

| | | |
|---|---|---|
| 681,884 | 2/1930 | France. |

HARRY N. HAROIAN, *Primary Examiner.*